Patented Nov. 9, 1937

2,098,779

UNITED STATES PATENT OFFICE 2,098,779

PURIFICATION OF AQUEOUS LIQUIDS FROM PHENOLS AND OTHER ACCOMPANYING SUBSTANCES

Paul Hermann Gericke, Paul Herold, Helmut Kratz, and Eberhard Vogt, Leuna, Germany, assignors to I. G. Farbenindustrie Aktiengesellschaft, Frankfort-on-the-Main, Germany No Drawing. Application September 5, 1935, Serial No. 39,302. In Germany September 28, 1934

7 Claims. (Cl. 260—154)

The present invention relates to improvements in the purification of aqueous liquids from phenols and other accompanying substances.

It has already been proposed to extract dissolved organic substances, as for example phenols, from aqueous liquids from various sources by subjecting the liquids to a treatment with solid adsorption agents, such as active carbon, and then further extracting the adsorbed substances with organic solvents, as for example, benzene, after the aqueous liquid has been expelled from the adsorption chamber by means of the organic solvents by the formation of layers. When the extraction has been completed, the solvent is removed from the active carbon by means of steam. The solvent is recovered by distillation.

We have now found that a much better effect is obtained by employing as extracting solvent liquid ammonia instead of the usual solvents, such as benzene, carbon disulphide or mixtures of benzene and alcohol. The procedure may for example be as follows:—

A charging of the adsorption chamber filled for example with active carbon is effected in the usual manner by causing aqueous liquid containing phenols and other accompanying organic substances to flow upwards therethrough. It is advantageous to operate two or more adsorption chambers one behind another. By suitable adjustment of the speed of flow of the aqueous liquid, the adsorption agent in the first adsorption chamber may be substantially saturated while the aqueous liquid leaves the second adsorption chamber practically free from the accompanying substances. When the adsorption agent in the first chamber is sufficiently charged, the supply of aqueous liquid thereto is discontinued and the aqueous liquid therein is removed. For this purpose gases of all kinds may be used; air is not recommended although its use does not render the process impossible; gases, such as nitrogen or hydrogen are more suitable.

The expelling of the water is advantageously effected by means of ammonia gas from the stock of liquid ammonia which is necessary for the further carrying out of the process. It has been found, contrary to expectation, that the greater part of the water content of the adsorbent chamber is expelled without adsorption of ammonia. Only the aqueous liquid leaving towards the end of the emptying contains absorbed ammonia and is preferably collected separately while the former portion of aqueous liquid is returned to the crude aqueous liquid. There is then carried out directly a treatment of the still wet adsorbent within the adsorption chamber by means of liquid ammonia for the extraction of the adsorbed substances, the treatment being carried on until the liquid ammonia leaving the chamber is free from extracted substances. This treatment may be carried out at atmospheric or increased pressure. It is thus possible to regulate the temperature at which the extraction with liquid ammonia is carried out as desired. It is preferable to carry out the said extraction at room temperature or at the same temperature at which the adsorption is carried out in order to render any cooling by evaporation of liquid ammonia unnecessary. The extraction of the said solid adsorption agents proceeds even at temperatures below zero C. so rapidly and thoroughly that the adsorbent has no appreciably reduced adsorptive power even after charging a hundred times or more. For such an extraction it is usually necessary to use about twice or three times the capacity of the adsorption chamber of liquid ammonia during the course of from about one to two hours.

When the extraction has been completed, the adsorption chamber is emptied of liquid ammonia; this may be assisted by increasing the vapor pressure of the liquid ammonia by heating and then blowing out liquid ammonia adhering to the adsorbent by means of steam. The amount of steam necessary is comparatively small and therefore the amount of pure aqueous ammonia which is preferably collected separately is inconsiderable. It may be employed as such for special purposes but, by reason of its small amount, may also be worked up with the used up extraction agent as explained hereinafter.

The adsorbent, which is still moist after rinsing with steam, is then ready for a further charging with crude aqueous liquid.

The ammonia employed for the extraction of the adsorbent which contains in addition to the adsorbed accompanying substances also water from the moist adsorbent, is preferably subjected to a distillation under pressure for its separation from the water if its recovery in the liquid state for the purpose of employment again as an extraction agent cannot be dispensed with and it is not to be further worked up as gas.

In this case an evaporation at atmospheric pressure is sufficient to separate the extracted substances in the form of a mixture of water and phenol almost free from ammonia.

The distillation under pressure is advantageously carried out in two parts. The greater part of the liquid ammonia may be conveniently driven over at slightly elevated temperature under a pressure of from 10 to 15 atmospheres by employing waste heat at low temperature, such as that of effluent warm cooling water or hot condensed water, without the use of a distillation column. No appreciable amounts of extracted substances pass over and the distillate may be directly employed for fresh extractions. The remaining small part of the extraction solution is split up by rectifying distillation under a pressure of from about 10 to 15 atmospheres at from 150° to 180° C. into a distillate of liquid ammonia and a mixture of water and phenol as the residue in cases when it is not preferred to evaporate the liquid ammonia contained in the said small part of the extraction solution at atmospheric pressure and further to work it up as gas as hereinbefore described.

With this residual small part of the extraction solution which remains after driving off the great part of the ammonia, it is advantageous, before its further working up, to incorporate that part of the crude aqueous liquid which has absorbed gaseous ammonia during the emptying of the adsorption chamber from the aqueous liquids before the extraction with liquid ammonia, and also if desired the condensed aqueous liquid containing ammonia obtained when rinsing the extracted adsorbent with steam. In this manner it is possible, in spite of the great solubility of ammonia in water, to restrict the waste of ammonia in continuous operation to a few per cent so that it is less than the waste of organic solvent in the known processes.

It has been found that the process according to this invention offers considerable advantages as compared with the processes hitherto known. Given the same charging conditions for the adsorbent, there is needed according to this invention only about one sixth of the amount of extraction agent as compared with the usual employment of benzene for this purpose. Apart from the great saving in time, there is also considerable saving in steam for heating for the working up of the extraction solution by distillation, not only by reason of the smaller amount of solvent to be vaporized but also by reason of the possibility of using hot water as the heating means for the distillation as already described.

In order to avoid high steam consumption in the known benzene process it has already been proposed to free the benzene used from adsorbed phenols not by distillation but by extraction with caustic soda solution. Compared with the process according to this invention, this process has the disadvantage that the extracted substances, namely the phenols, are not separated as such but as phenolates. For their further employment they must first be set free by means of carbon dioxide or strong mineral acids. This modified process thus requires two new raw materials, namely caustic soda solution and acid, and this to a large extent counteracts the saving in steam.

A further advantage of the process according to this invention consists in the fact that the adsorptive power of the adsorbent subsides considerably more slowly by charging with crude aqueous solutions and subsequent extraction with liquid ammonia in continuously repeated operation than when employing the solvents hitherto proposed.

It has been established for example that active carbon still retains more than 90 per cent of its original adsorptive capacity after far more than a hundred chargings in the removal of phenol from waste aqueous liquids from the destructive hydrogenation of coal, and subsequent extraction with liquid ammonia, while when using the same active carbon for the same purpose according to the benzene process under otherwise similar conditions, the adsorptive power is reduced far below half within the same time.

The process according to the present invention has been found to be of particular advantage for the purification of aqueous liquids containing phenols which are obtained in hydrogenation processes, in particular the destructive hydrogenation, and further in low temperature carbonization. But also aqueous liquids containing phenols which are obtained in other processes may be worked up with advantage by the process according to the present invention. As is known, these aqueous liquids also contain certain amounts of tarry constituents.

The following examples relate to the removal of phenol from hydrogenation waste aqueous liquids of three different concentrations in an adsorption chamber 5 meters in height containing 20 liters of granular active carbon (6.8 kilograms). With each liquid there is carried out a washing with ammonia and also a washing with benzene for the purpose of comparison. For the repeated alternation of charging and extraction, those conditions are selected which have proved most favorable for continuously repeated operation in practice. The slower speed of flow of the benzene is the result of the extremely rapid subsidence in the adsorptive capacity. If the throughput per hour of benzene were brought to the same value as when working with liquid ammonia, the values for benzene would be even more unfavorable. Since when working up waste aqueous liquids, as for example waste water containing phenol, they are usually only purified down to a certain final concentration, the average final concentrations of the effluent aqueous liquid from the beginning to the end of the charging periods are given.

It should be understood, however, that the present invention is not restricted to the following examples.

*Example 1*

Phenol content in crude aqueous liquid_____gram per liter__ 0.750
Phenol content in final aqueous liquid_____gram per liter__ 0.050
(Average value of the 22nd charging period)
Throughput when using benzene_____liters per hour__ 40
Throughput when using liquid ammonia_____liters per hour__ 80

|  | Benzene | Liquid ammonia |
|---|---|---|
| Amount of aqueous liquid introduced in each charging period. | 240 liters | 400 liters. |
| Phenol adsorbed | 168 grams | 280 grams. |
| Percentage of charging, calculated on the weight of carbon. | 2.5 per cent | 4.1 per cent. |
| Amount of solvent necessary | 53 kilograms | 16 kilograms. |
| Amount of solvent necessary per cubic meter of crude aqueous liquid. | 220 kilograms | 40 kilograms. |

Example 2

Phenol content in crude aqueous liquid _____ grams per liter __ 3.6
Phenol content in final aqueous liquid _____ gram per liter __ 0.2
(Average value of the 40th charging period)
Throughput when using benzene _____ liters per hour __ 40
Throughput when using liquid ammonia _____ liters per hour __ 60

|  | Benzene | Liquid ammonia |
|---|---|---|
| Amount of aqueous liquid introduced in each charging period. | 100 liters. | 280 liters. |
| Phenol adsorbed. | 340 grams. | 950 grams. |
| Percentage of charging calculated on the weight of carbon. | 5 per cent. | 14 per cent. |
| Amount of solvent necessary. | 35 kilograms. | 16 kilograms. |
| Amount of solvent necessary per cubic meter of crude aqueous liquid. | 350 kilograms. | 57 kilograms. |

Example 3

Phenol content in crude aqueous liquid _____ grams per liter __ 9.5
Phenol content final aqueous liquid _____ gram per liter __ 0.36
(The content of the final aqueous liquid in the case of benzene is the average concentration of the 45th charging period, in the case of liquid ammonia the average of 90th charging period.)
Throughput when using benzene _____ liters per hour __ 20
Throughput when using liquid ammonia _____ liters per hour __ 60

|  | Benzene | Liquid ammonia |
|---|---|---|
| Amount of aqueous liquid introduced in each charging period. | 110 liters. | 270 liters. |
| Phenol adsorbed. | 1,000 grams. | 2,460 grams. |
| Percentage of charging, calculated on the weight of carbon. | 14.7 percent. | 36.2 percent |
| Amount of solvent necessary. | 70 kilograms. | 25 kilograms. |
| Amount of solvent necessary per cubic meter of crude aqueous liquid. | 640 kilograms. | 93 kilograms. |

What we claim is:—

1. A process for the purification of aqueous liquids from phenols and other accompanying substances comprising tarry constituents which comprises treating such aqueous liquids with a solid adsorption agent, the said phenols and other accompanying substances thereby being adsorbed by the said adsorption agent and thereupon extracting the adsorbed phenols from the solid adsorption agent containing the same by treatment with liquid ammonia.

2. In the process as claimed in claim 1, starting from a liquid containing phenols which has been obtained by a process selected from the group consisting of hydrogenations and low temperature carbonization.

3. In the process as claimed in claim 1, continuously passing the aqueous liquid containing phenols and other accompanying substances through the adsorption agent and stopping the supply of the said aqueous liquid after the adsorption agent has taken up a substantial amount of phenols.

4. In the process as claimed in claim 1, treating the aqueous liquid with the solid adsorption agent, then removing from the solid adsorption agent the bulk of the liquid enclosing this adsorption agent by means of gaseous ammonia, and thereupon extracting the adsorbed phenols with liquid ammonia.

5. In the process as claimed in claim 1, extracting the phenols adsorbed by the solid adsorption agent by means of liquid ammonia and then removing from the adsorption agent the bulk of the liquid ammonia enclosing this adsorption agent by means of its own vapor.

6. In the process as claimed in claim 1, distilling from the liquid ammonia extract the bulk of the liquid ammonia under its own vapor pressure by warming to a slightly elevated temperature and liquefying again this distilled ammonia and subjecting the remaining portion of the liquid ammonia extract to a rectifying distillation, this portion thus being separated into ammonia and a mixture of water and phenols.

7. In the process as claimed in claim 1, treating the initial aqueous liquid with the solid adsorption agent, removing from the solid adsorption agent the bulk of the liquid enclosing this adsorption agent by means of gaseous ammonia, separating from this bulk of the liquid the portion containing absorbed gaseous ammonia, extracting the solid adsorption agent containing adsorbed phenols with liquid ammonia, distilling from the liquid ammonia extract the bulk of ammonia, adding the beforementioned portion of aqueous liquid containing absorbed gaseous ammonia to the remainder of the liquid ammonia extract and then subjecting the resulting mixture to a rectifying distillation, the mixture thus being separated into ammonia and a mixture of water and phenols.

PAUL HERMANN GERICKE.
PAUL HEROLD.
HELMUT KRATZ.
EBERHARD VOGT.